Aug. 1, 1933.  H. N. WYLIE  1,920,830
METHOD OF MAKING PROPELLER BLADES
Filed Jan. 27, 1932

Inventor:
Hamilton Neil Wylie,
By Mawhinney & Mawhinney,
Attys.

Patented Aug. 1, 1933

1,920,830

UNITED STATES PATENT OFFICE 1,920,830

METHOD OF MAKING PROPELLER BLADES

Hamilton Neil Wylie, Whitley, near Coventry, England, assignor to Sir W. G. Armstrong Whitworth Aircraft Limited, Whitley, near Coventry, England Application January 27, 1932, Serial No. 589,271, and in Great Britain February 4, 1931

1 Claim. (Cl. 29—156.8)

This invention relates to hollow-bladed metal air-screws or other propellers of the kind where each blade is formed from a metal tube which is of constant bore or constant external diameter and is preferably tapered in thickness. It has for its main object to provide an inexpensive blade of small weight but of considerable strength and durability, with a smooth, unbroken, leading edge.

According to the invention, each blade is formed by the metal tube, whilst of constant bore or constant external diameter, being pressed to substantially the desired aerofoil section. Preferably each blade is reduced in width towards the tip by removal of a part, the open edges left by the removal being united.

According to one method of carrying out the invention, each blade is formed by pressing and cutting to shape a metal tube of substantially constant outside diameter and decreasing thickness towards the tip, the open edges, which are substantially wholly on the trailing edge, being united.

Figure 1:
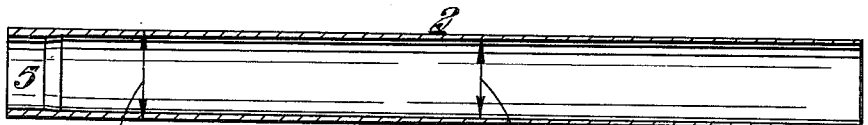
Figure 2:
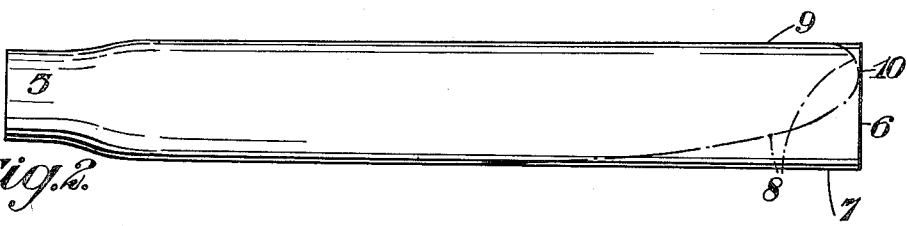
Figure 3:
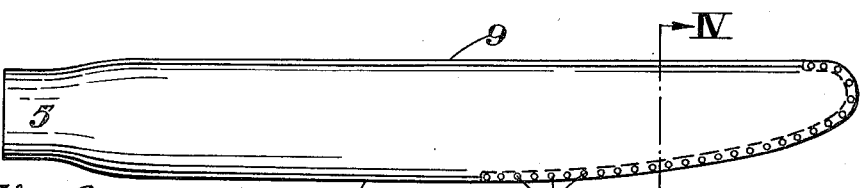
Figures 4, 5, 6:
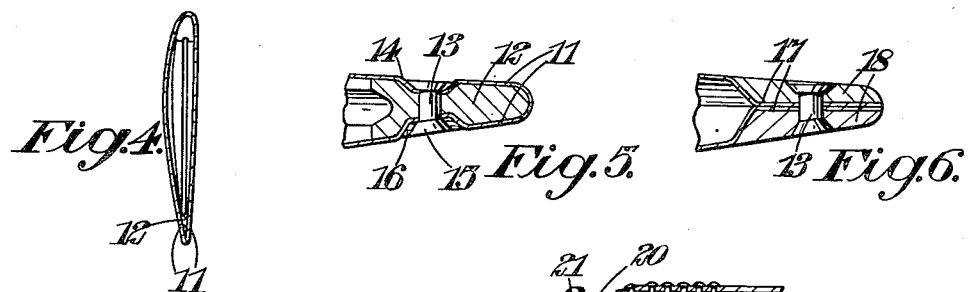
Figure 7:
Figure 8:
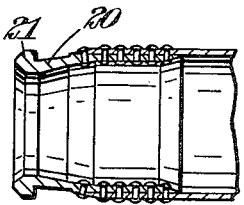
Figure 9:
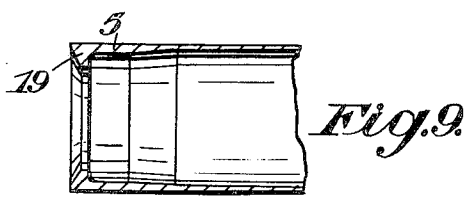
Figure 10:
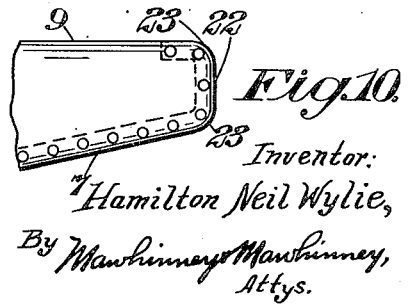

In the accompanying drawing,

Figure 1 is a central longitudinal section of a tube before being acted upon in accordance with the invention, Figures 2 and 3 are elevations of the tube after being acted upon in accordance with the invention, Figure 2 showing the tube after a pressing operation, whilst Figure 3 shows the tube in the finished form of a propeller blade, Figure 4 is a section, to a larger scale, on the line IV—IV of Figure 3, Figure 5 is a fragmentary section, to a larger scale, of the trailing edge of the blade showing one method of joining the open edges thereat, Figure 6 is a similar section to Figure 5, but illustrating a modified method of joining the open edges, Figures 7, 8 and 9 are fragmentary sections of modified root ends of propeller blades, and Figure 10 is a fragmentary elevation of an alternative type of blade tip to that shown in Figure 3.

In one method of carrying out this invention as illustrated in Figures 1-5, a blade is formed from a piece of steel tube 2 (Figure 1) the outer diameter 3 of which is uniform, whilst the inner diameter 4 increases along the length of the blade from the end 5 which eventually forms the root of the blade, so as to reduce the wall thickness.

The tube is then placed between dies and pressed either to the ultimate section required, or to a shape which approximates thereto, as shown in Figure 2. The sections adopted are those usual in propeller design, and this pressing operation may be effected in one or more stages, with or without an internal supporting mandrel, at one or more parts. Then the outer end 6 and one of the sides 7 of the shaped tube are cut away along a line, indicated at 8 in Figure 2, the side 7 eventually forming the trailing edge of the blade. The point on the edge 7 which forms the commencement of the cut-away part is at a substantial distance along this edge so that the blade has the required taper in both directions. The cut-away part also includes a small portion of the tube along the edge 9 in order that the tip 10 of the blade can be finished as a curve. The straight edge 9 eventually becomes the leading edge when the blade is attached to the hub portion, not shown.

This cutting away provides an opening at the outer end of the blade through which can be passed a mandrel or other device, not shown, for removing dents or other undesired irregularities in the walls of the blade after the pressing operation.

The open edges 11, 11 left in the cutting-away operation are then joined together in any suitable manner. For example, these edges may be bent to conform to the blade section as shown in Figures 4 and 5, and an internal filling-in piece 12 is inserted between the edges and a series of countersunk rivets 13, 13 passed through the two walls and the filling-in piece, the latter being recessed around the rivets so that the countersunk parts 14, 14 in the edges can lie therein whilst the heads 15, 15 are substantially flush with the outer surface of the blade. Preferably, the head of each rivet is expanded into a tapered washer 16 disposed in one of the countersunk parts 14.

Alternatively, the open edges may be flanged as at 17, 17, Figure 6, the flanges being arranged to abut against one another, smoothness of the outer surfaces being maintained by a filling-in piece 18 outside each flange, such filling-in pieces and the two flanges being all secured together by a row of countersunk rivets 13.

The flanges may be disposed in the mid-plane of the blade or otherwise to suit the section of the blade.

Joints of these types hold the cut edges firmly and help to stiffen the thin metal walls. This, and also the small cross-section of the blade near the tip, prevents the walls "panting", or vibrating, and avoids the occurrence of concentrated stresses round the rivet heads which might lead to local fracture.

Where necessary, the root end 5 of the tube may be left either wholly or partly unaffected by the pressing operation and Figures 1-3 illustrate a root 5 which is not acted upon. Finally this end is swaged up, as in Figures 7 and 9, to increase its thickness and to provide a projecting flange or collar 19 (which is external in Figure 7 and internal in Figure 9) through the medium of which it is subsequently secured to a hub or root fitting. In some cases this end of the tube may be formed specially thick in the operation of drawing the tube, as in Figure 1, and may be further thickened by the swaging process. Alternatively, as shown in Figure 8, a socket 20 having a flange 21 is secured to the root end by riveting as shown, or otherwise, to provide a projecting abutment for the root attachment.

Various shapes may be adopted towards the tip instead of that described with reference to Figures 2 and 3. For example, the end may be cut off square, as at 22 in Figure 10, with the corners rounded at 23, the rounding on the corner adjacent the trailing edge running smoothly into that edge.

The invention enables a one-piece hollow blade with a smooth and unbroken leading edge to be produced in a very simple and inexpensive manner. The blade narrows towards its tip and therefore is of a section which is strong and unlikely to "pant", even though the walls at the tip are very thin. The weight at the tip can therefore be low and thinner metal than usual can be used towards the root, in view of the low centrifugal stresses to which that part of the blade is subjected.

The manufacturing operations need not necessarily be carried out in the sequence in which they are described, as, in some cases, it might be practicable to cut the tube first before the pressing or other similar shaping operation.

What I claim as my invention and desire to secure by Letters Patent of the United States is:—

The method of forming a single blade for a propeller, which consists in taking a metal tube of substantially constant outside diameter and with its wall decreasing in thickness towards its tip and pressing the tube to desired aerofoil shape, cutting the shaped tube around the tip and slightly into the leading edge and mainly into the trailing edge for a substantial distance from the tip and removing the metal therefrom to provide a tip and trailing edge formation to the propeller, and uniting the cut free edge portions of the tube.

HAMILTON NEIL WYLIE.